Feb. 5, 1935.  C. J. HOLLAND  1,990,378
COMBINATION TRUCK SPRING
Filed Oct. 29, 1930
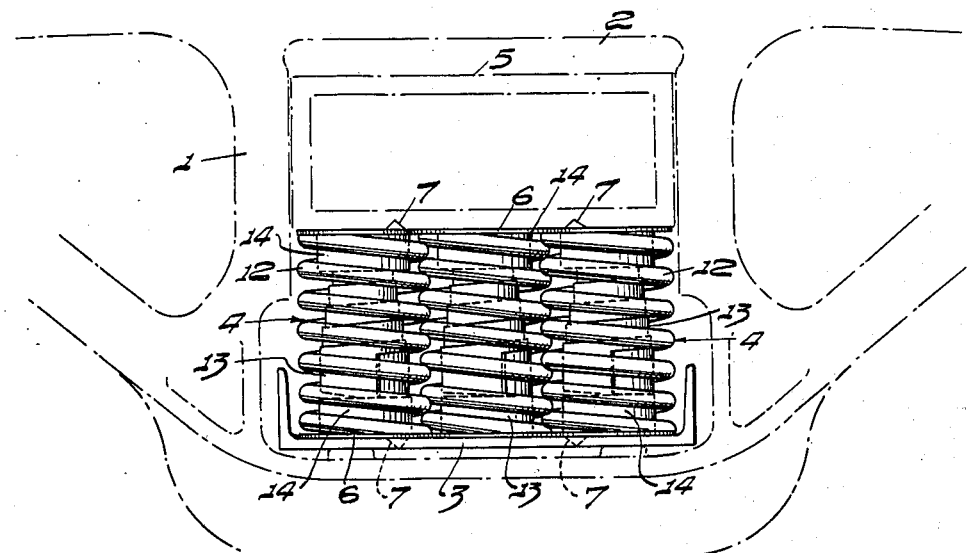
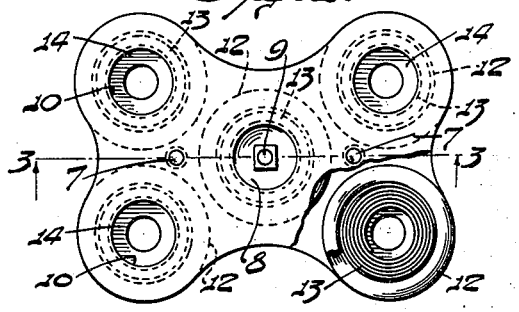
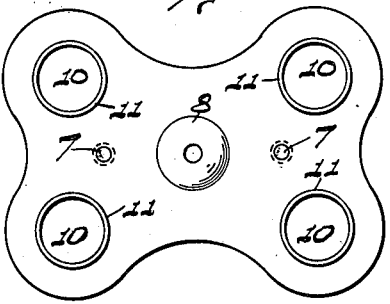
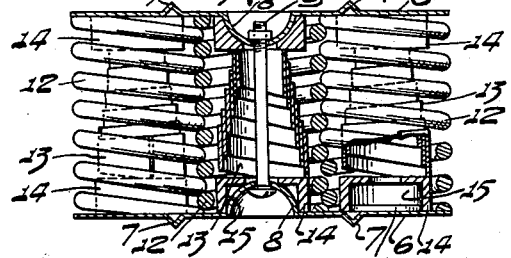
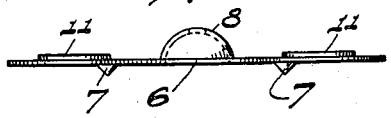
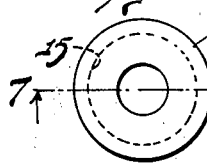
Inventor
Cyrus J. Holland
By Ernest P. Mechlin
Attorney Patented Feb. 5, 1935

1,990,378

UNITED STATES PATENT OFFICE 1,990,378

COMBINATION TRUCK SPRING

Cyrus J. Holland, Chicago, Ill., assignor to Holland Company, Chicago, Ill., a corporation of Illinois Application October 29, 1930, Serial No. 492,048

18 Claims. (Cl. 267—4)

The invention relates to cushioning devices or spring means for general use, particularly for employment in the running gear of vehicles, and especially in railway trucks for resiliently supporting the load.

Until about ten years ago the provision of cushioning means in railway freight car trucks was a comparatively simple problem to solve, a common practice being to provide a suitable number of helical springs interposed between the spring blank and the bolster because the standard A. R. A. double coil freight car truck spring provided the necessary capacity for the various classes of cars by varying the number of coils used in accordance with the capacity of the car. Ordinarily the window opening in such trucks, both arch bar and cast steel truck side frame, limited the number of springs in the nest to five double coils. About ten years ago the American Railway Association changed the method of figuring the capacity of a car so that a 100,000 pound capacity car, which at that time was permitted to carry a 10% overload, became a car that could carry a maximum of 169,000 pounds including the weight of the car. This change permitted cars to be loaded heavier under the new ruling than under the old and developed the fact that the five double coil spring nest did not have sufficient capacity to take care of the new load. The A. R. A. have since that time endeavored to increase the capacity of their standard double coil truck spring from 16,000 pounds to 20,000 pounds per double coil. In an effort to do this they designed a chrome molybdenum double coil spring fully described in the Car Builders Encyclopedia of 1922 and subsequent issues. However, this spring appears not to have met the requirements because it has not gone into general use and as an alternative cars of 169,000 pounds capacity and over have generally been equipped with the Dalman or similar type of truck in which a larger window opening is provided which permits of using more than five coils in the spring nest. Increasing the number of coils in the spring nest provides the additional capacity required for the heavy load but this method has the disadvantage of reducing the resiliency of the cushioning assembly for light and intermediate loads.

The foregoing discussion will give a clear understanding as to the situation regarding springs in the railway art and this explanation is made simply for the purpose of more clearly setting forth the underlying reasons for the invention and its particular and peculiar adaptability, it being, however, distinctly understood that my invention is not in any way limited to the specific illustrative use disclosed.

Generally speaking, the object of the invention is to provide a cushioning means of greater capacity without increasing the size of the elements thereof, the principal feature consisting in the utilization of one or more volute springs in combination with one or more springs of a different type, not only for the purpose of increasing the capacity but also damping oscillations because a volute spring has a friction producing characteristic.

Another object of the invention is to provide a cushioning assembly comprising a plurality of volute springs and helical springs.

A more specific object of the invention is to provide a shock absorbing or cushioning means interposed between or including the usual standard spring caps employed in a railway car truck and embodying volute and helical springs operating in parallel with the springs of the two types arranged concentrically.

Another specific object of the invention is to provide an assembly including standard spring caps and a combination of volute and helical springs interposed therebetween, the helical springs surrounding the respective volute springs and the latter having their own individual caps serving as centering or retaining means for the helical springs which thereby retain the volute springs in place.

The invention further contemplates the provision of an assembly of this character possessing the specified advantageous characteristics and which will yet be inexpensive to make and assemble and as easy to install as a cushioning device of ordinary pattern.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a partial side elevation of a railway truck showing the bolster supported upon a cushioning assembly embodying a group or cluster of five spring units each including concentrically arranged helical and volute springs, Figure 2 is a plan view, partly broken away, of the cushioning assembly, Figure 3 is a section on the line 3—3 of Figure 2, Figure 4 is a plan view of the inner side of one of the caps, Figure 5 is a side elevation thereof, Figure 6 is a plan view of one of the adapters or individual caps for the volute springs, Figure 7 is a cross section taken on the line 7—7 of Figure 6.

Referring more particularly to the drawing the numeral 1 designates a portion of the side frame of a railway truck having the usual window opening 2 within which is mounted the end of a spring plank 3 carrying the spring assembly 4 which supports the end of the bolster 5. The assembly 4 includes upper and lower caps 6 which are similar and which are provided ordinarily with projections 7 fitting within the recesses in the underside of the bolster and in the top of the spring plank. Centrally the caps are provided with depressed portions 8 perforated for the passage of a tie bolt 9 for the purpose of holding the assembly together prior to installation within the truck. Each cap is provided with openings 10 surrounded by flanges 11, the latter entering the inside diameter of the inner coil for the purpose of maintaining the spring units in position so that they cannot be displaced laterally in any direction.

In carrying out the invention I provide a combination of helical and volute springs interposed between the caps 6 and it will be observed that while in each instance I have disclosed each unit as comprising a helical spring and a volute spring, it is within the purview of what I contemplate to use as few as one of the combined units, the others being simple helical spring units, if such is found desirable for any reason, as for example in case it is not necessary to provide such an extremely high spring capacity and in such an instance it is very likely that the volute spring of any one or more units will be replaced by an inner or small diameter helical spring for instance as is done in the A. R. A. standard type of assembly.

However, aside from any question of variation or alternative arrangement, in this particular instance I have shown each of the units in the cluster as comprising an outer helical spring 12 surrounding the volute spring 13 which may, moreover, if desired, be constructed of tapered bar stock as particularly disclosed in my application for patent for Volute spring adapted for trucks filed of even date herewith. To provide, in connection with standard spring caps, bearing surfaces for the opposite ends of the volute springs, I provide auxiliary individual caps 14 which are recessed as shown at 15 so as to have one side fit over and interlock with the flanges 11 and/or the projections 8 of the main spring caps 6 and the opposite side to provide a bearing face for the opposite ends of the volute springs. By interlocking the spring caps 14 with the flanges 11 and/or projections 8 of the main spring caps 6 and by making the diameter of the auxiliary spring caps 14 slightly less than the interior diameter of the helical springs 12, the auxiliary spring caps serve to center and maintain the helical springs in position and the latter act to maintain the volute springs 13 in assembled position with the auxiliary caps. In this manner all the parts are interlocked with the main spring caps and are maintained in fixed position during the compression and release of the springs in operation.

In the operation it will of course be apparent that the load is sustained by my novel cushion assembly in the same general manner as when helical springs alone are used. However, in view of the fact that volute springs adapted to be substituted in a truck spring group have a tremendously greater capacity than helical springs it is apparent that very heavy loads may be easily and properly sustained without increasing the number of springs or making any changes in the size of the window opening or other parts of the truck. Another great point of advantage is that volute springs naturally having a friction producing characteristic will operate to damp out or at least greatly reduce oscillations, thereby avoiding the building up of a vertical "jiggle" or car body roll which as is well known is very objectionable. From my experience it would seem that there has been a general misunderstanding on the subject of periodicity of spring vibration or oscillation. Many persons experienced in the art have labored under the belief that a helical spring of certain dimensions has a particular definite period of vibration. However, this is apparently not true as periodicity is a property of deflection and deflection is effected by load. Therefore it will appear that a helical spring is not a spring of a fixed period as it will have one period under one deflection and another period under another degree of deflection. However, a volute spring and a helical spring of the same travel will not have the same periodicity for the same deflection for the reason that a helical spring settles proportionately whereas a volute spring settles progressively—that is the largest coil settles first, then the next largest, and so on. Another way of saying this is that in the volute spring the base gradually becomes longer, shortening the lever arm of the spring. However that may be, it is not my belief that springs of different periods can prevent oscillation for practical purposes, for it is logical that periods in springs will combine in the same manner as sound frequencies to produce a new frequency. In order to obtain the required dampening effect in springs it is necessary to introduce a percentage of energy absorption which should be in the form of a spring having a percentage of energy absorption as a natural characteristic, such as a volute spring or an elliptic spring. Such an arrangement will permit of greater resiliency than can be obtained by the introduction, in connection with springs, of extraneous friction devices as such, though acting to stop oscillation will more than likely result in hard riding of the lading. Furthermore it will be observed that spring units according to my invention occupy the same relative positions as usual and that they can be employed in conjunction with ordinary spring caps by the simple expedient of providing the individual auxiliary caps which act as centering means for the helical springs so that the latter as well as the former cannot possibly become displaced. From the foregoing discussion it is believed that the construction, operation and advantages should be readily apparent to one skilled in the art without further explanation.

While I have shown and described an assembly or cluster including five units, it should be distinctly understood that the number may be varied. Furthermore while I have shown each unit as comprising a volute spring surrounded by a helical spring it is conceivable that instead of having all the units identical some of them may be simply helical springs or, possibly, simply volute springs. In fact I reserve the right to make all such changes in the arrangement and combination as will not depart from the spirit of the invention or the scope of the claims hereunto appended.

Having thus described the invention, I claim:

1. A spring unit including a plurality of helical springs, each of said springs being directly interposed between and operating against the outer caps of a spring nest, and a plurality of volute springs each of which is enclosed within one of said helical springs, each of said volute springs being adapted to serve as a load sustaining member, said volute springs also acting to reduce the amplitude and number of oscillations of said spring unit.

2. In a railway car truck including a bolster, supporting means for the bolster comprising a spring assembly including spring caps, and a plurality of spring units interposed therebetween, at least some of the units each including a single volute spring within a helical spring.

3. In a railway car truck including a bolster, a spring assembly for supporting the bolster comprising spring caps, a plurality of spring units interposed therebetween, at least certain of the units each including a volute spring provided at its ends with auxiliary caps, and a helical spring surrounding the volute spring and the auxiliary caps thereof.

4. A spring assembly for supporting a railway car truck bolster, comprising main spring caps, a plurality of spring units located therebetween, at least certain of the units each including a helical spring directly engaging against the main caps and further including an interiorly located volute spring provided at its ends with individual caps fitting within the helical spring and serving as centering means therefor.

5. In a truck spring, the combination with main spring caps, of auxiliary spring caps resting respectively against said main caps and restrained against lateral displacement, a coil spring engaging at opposite ends about said auxiliary caps against said main spring caps, and a spring interposed between opposite ones of said auxiliary spring caps and maintained in position by said first named spring.

6. In a truck spring, the combination with main spring caps, of spring units interposed therebetween, at least one of said units comprising an outer coil spring of a given length and travel, auxiliary spring caps seated within the opposite ends of said spring and adapted to maintain said spring in assembled position, and a second spring member of less length than said coil spring interposed between said auxiliary spring caps, said second spring member being of volute form and having a travel equal in length to said coil spring.

7. In a railway car truck, the combination with the main spring caps, of inner and outer springs one of which is a single volute spring, means interior of the outer coil arranged to form bearing members for the inner coil, said means being adapted to interlockingly connect said outer coil to said spring caps.

8. In combination with bearing means at opposite sides of a spring unit including means to position a spring unit therebetween, a spring unit including a single volute spring and a spring of other form, a member between said volute spring and said bearing means, adapted on one side to act as volute spring bearing means and on the other side to interlock with said positioning means on said bearing means to thereby retain said spring unit in a fixed position.

9. In combination, a spring unit composed of a single volute spring and a spring of other form, members at the ends of said spring unit including means to anchor said unit thereto, means between said volute spring and said members adapted to, on one side, serve as bearing means for said volute spring and on the other side to interlock with retaining means on said members, to thereby retain said spring unit in a fixed position.

10. In combination with bearing means at either side of a spring unit including means to position a spring unit against displacement, a spring unit consisting of a single volute spring and a spring of other form, a volute spring bearing member adapted to cooperate with said positioning means and said spring of other form to thereby locate said spring unit against displacement.

11. In combination with a spring cap incorporating means to position a spring thereon, a spring unit composed of a single volute spring and a spring of other form, a volute spring bearing member adapted to cooperate with said positioning means on said spring cap to thereby locate said spring unit against displacement.

12. A spring suspension including spring seats, a helical coil spring surrounding a single volute coil spring and means, interior of said helical coil spring, to retain said springs in a fixed position in relation to said spring seats.

13. A spring suspension unit composed of a single volute spring and a spring of other form, a bottom member and a top member therefor, incorporating means to retain a spring suspension unit in fixed relation thereto, a member engaging the end of said volute spring and located within said spring of other form, said last named member including means cooperating with said first named spring retaining means.

14. A volute spring cap or seat adapted on one side to provide a bearing for a volute spring and on the other side to provide interlocking means against displacement.

15. In a car truck, the combination of a pair of members, of a spring unit interposed therebetween, said unit comprising a helical coil and a resilient member consisting of a plurality of coils and formed from flat bar or plate stock and having surfaces adapted for rubbing action relative to each other, said coil and member being concentric and cooperating to resiliently support a load, and means, of less free height than the free height of said spring unit, to locate said spring unit between said pair of members.

16. In a vehicle, a truck, a spring assembly for supporting a load from said truck, said assembly comprising coil springs each having turns of substantially uniform cross section, one of said springs being helical and another of said springs being a volute spring located within said helical spring, certain of the turns of said volute spring being rectangular in cross section and provided with rubbing surfaces for frictionally resisting harmonic spring action of said assembly, a spring engaging member extending across and engaging the upper and the lower ends of said springs for causing the same to move in parallel when said assembly is compressed, and retaining means for holding said spring engaging members and said springs in position, said springs and said retaining means when in position of service lying wholly between the upper and lower spring engaging members.

17. In a vehicle, a truck, a spring assembly for supporting a load from said truck, said assembly comprising at least one resilient helical spring having its turns of substantially uniform cross section and a coil spring within said helical spring and having its turns rectangular in cross section, each of said turns being provided with a rubbing surface for frictionally engaging adjacent turns for resisting harmonic action of said springs during the travel of said truck, spring engaging members engaging the upper and lower extremities of said springs for causing said springs to operate in parallel when said assembly is compressed and means for holding said spring engaging member and said springs in operative position, said springs and said holding means when in position of service lying wholly between the upper and lower spring engaging members.

18. In a vehicle, a truck, a spring assembly for resiliently supporting a load from said truck, said assembly including a resilient unit comprising an inner coil spring member having resilient load supporting turns and an outer coil spring member surrounding said inner member and provided with resilient load supporting turns, the resilient turns of each member being of substantially uniform cross section, certain of said resilient load supporting turns of said unit each being rectangular in cross section and provided with a rubbing surface frictionally engaging an adjacent cooperating load supporting turn of said unit for reducing harmonic action of said spring assembly during the movement of said truck, means extending across the upper and lower extremities of said members and engaging the same for causing said members to operate in parallel when said unit is compressed, and retaining means for retaining said coil spring members between said first-named means during service, all parts of said assembly, including said retaining means, being located between the planes of said first-named means while in service.

CYRUS J. HOLLAND.

CERTIFICATE OF CORRECTION.

Patent No. 1,990,378. February 5, 1935.

CYRUS J. HOLLAND.

It is hereby certified that error appears in the printed specification of the above numbered patent requiring correction as follows: Page 3, first column, line 44, claim 5, before "spring" insert the words single volute; and that the said Letters Patent should be read with this correction therein that the same may conform to the record of the case in the Patent Office.

Signed and sealed this 12th day of March, A. D. 1935.

Leslie Frazer (Seal) Acting Commissioner of Patents.